(12) United States Patent
Kobayashi (10) Patent No.: US 10,655,817 B2
(45) Date of Patent: May 19, 2020

(54) LIGHT EMITTING APPARATUS

(71) Applicant: HOYA CANDEO OPTRONICS CORPORATION, Toda-shi, Saitama (JP)

(72) Inventor: Norio Kobayashi, Toda (JP)

(73) Assignee: HOYA CANDEO OPTRONICS CORPORATION, Toda-Shi, Saitama (JP)

( * ) Notice: Subject to any disclaimer, the term of this patent is extended or adjusted under 35 U.S.C. 154(b) by 0 days.

(21) Appl. No.: 16/014,966

(22) Filed: Jun. 21, 2018

(65) Prior Publication Data

US 2018/0372301 A1 Dec. 27, 2018

(30) Foreign Application Priority Data

Jun. 22, 2017 (JP) .................. 2017-121893

(51) Int. Cl.

| | |
|---|---|
| F21V 21/00 | (2006.01) |
| F21V 7/16 | (2006.01) |
| F21V 29/70 | (2015.01) |
| B01J 19/12 | (2006.01) |
| F21S 43/14 | (2018.01) |
| B41F 23/04 | (2006.01) |
| F21V 17/02 | (2006.01) |
| F21V 29/505 | (2015.01) |

(52) U.S. Cl.
CPC ............. *F21V 7/16* (2013.01); *B01J 19/12* (2013.01); *B41F 23/0409* (2013.01); *B41F 23/0453* (2013.01); *F21S 43/14* (2018.01); *F21V 17/02* (2013.01); *F21V 29/70* (2015.01); *F21V 29/505* (2015.01)

(58) Field of Classification Search
CPC .......... F21V 7/16; F21V 29/505; F21V 29/70; F21S 43/14; B01L 19/12; B01J 19/12
USPC ........................................................ 362/560
See application file for complete search history.

(56) References Cited

U.S. PATENT DOCUMENTS

| | | | | |
|---|---|---|---|---|
| 3,792,230 A | * | 2/1974 | Ray .................. | B23K 1/0053 |
| | | | | 200/81.9 M |
| 4,763,231 A | * | 8/1988 | Houplain ............ | F21V 19/0005 |
| | | | | 362/148 |
| 6,588,922 B1 | * | 7/2003 | DeCicco .............. | F21V 21/04 |
| | | | | 362/148 |

(Continued)

FOREIGN PATENT DOCUMENTS

JP 2013-215661 A 10/2013

*Primary Examiner* — Laura K Tso
(74) *Attorney, Agent, or Firm* — Rabin & Berdo, P.C.

(57) ABSTRACT

A light emitting apparatus includes a light source, a thin plate-shaped mirror unit which guides light from the light source, and a tension imparting means which imparts tension to the mirror unit. The tension imparting means may have at least any one of a first tension imparting mechanism which imparts tension in a first direction toward the light source along a surface of the mirror unit and a second tension imparting mechanism which imparts tension in a second direction opposite to the first direction, and further, the tension imparting mechanism may have at least any one of a third tension imparting mechanism which imparts tension in a third direction in parallel with the light source along the surface of the mirror unit and a fourth tension imparting mechanism which imparts tension in a fourth direction opposite to the third direction.

19 Claims, 9 Drawing Sheets

(56) References Cited

U.S. PATENT DOCUMENTS

| | | | | |
|---|---|---|---|---|
| 8,733,962 B1* | 5/2014 | Leslie | ............... | F21V 7/041 |
| | | | | 362/148 |
| 2004/0120161 A1* | 6/2004 | Hwang | ............ | G02F 1/133608 |
| | | | | 362/558 |
| 2013/0343060 A1* | 12/2013 | Yu | ............ | F21V 7/00 |
| | | | | 362/296.01 |
| 2014/0029283 A1* | 1/2014 | Boyd, Jr. | ............ | F21S 43/14 |
| | | | | 362/511 |
| 2014/0146535 A1* | 5/2014 | Hoffmann | ............ | F21V 19/004 |
| | | | | 362/249.02 |
| 2015/0241037 A1* | 8/2015 | Zhang | ............ | F21V 13/04 |
| | | | | 362/308 |

* cited by examiner

LIGHT EMITTING APPARATUS

TECHNICAL FIELD

The present invention relates to a light emitting apparatus which emits light to a predetermined irradiation region, and more particularly, to a light emitting apparatus which is provided with a reflecting mirror that guides light from a light source.

BACKGROUND ART

In the related art, ultraviolet ray curable ink, which is cured by emitted ultraviolet light, is used as offset sheet printing ink. In addition, ultraviolet ray curable resin is used as a sealing agent used for flat panel displays (FPDs) such as liquid crystal panels and organic electro luminescence (EL) panels. In general, an ultraviolet light emitting apparatus, which emits ultraviolet light, is used to cure the ultraviolet ray curable ink or the ultraviolet ray curable resin, and particularly, a light emitting apparatus having multiple light emitting elements, which are arranged on a substrate so as to be directed toward an irradiation region is used to perform the offset sheet printing or manufacture the FPDs because it is necessary to emit the ultraviolet light with high irradiation intensity toward the irradiation region having a wide width and a rectangular shape (for example, see Patent Document 1).

The ultraviolet light emitting apparatus disclosed in Patent Document 1 has a base plate on which multiple light emitting elements are two-dimensionally disposed, a reflection tube (mirror units) which is disposed to surround the base plate and guides ultraviolet light emitted from the light emitting elements, and a cooling unit which cools the base plate. Further, the ultraviolet light emitting apparatus is configured to obtain a uniform irradiation distribution in the irradiation region by mixing the ultraviolet light by using the mirror units.

PRIOR ART DOCUMENT

Patent Document

[Patent Document 1]
  Japanese Patent Application Laid-Open No. 2013-215661

DISCLOSURE OF THE INVENTION

Problems to be Solved by the Invention

According to the configuration disclosed in Patent Document 1, heat generation from LEDs is inhibited and a uniform irradiation distribution is obtained in the irradiation region because light from each of the respective LEDs is mixed by the mirror units.

However, there is a problem in that when the mirror units are irradiated with the ultraviolet light, the mirror units are heated to a high temperature and deformed by being thermally expanded. In addition, there is a problem in that the mirror units are repeatedly heated and cooled while the mirror units are used over a long period of time, with the result that all of the mirror units are distorted. Further, because of the deformation of the mirror units, there is a problem in that the mixing of the ultraviolet light is not performed as designed, and the irradiation distribution in the irradiation region is not uniform.

For example, a configuration in which multiple screws are disposed on surfaces of the respective mirror units to fix the mirror units may be considered to inhibit the deformation of the mirror units, but in the case in which this configuration is adopted, a decrease in light quantity caused by threaded portions cannot be ignored, and it is difficult to obtain a desired light quantity. In addition, it takes time to assemble the mirror units.

The present invention has been made in consideration of the aforementioned situations, and an object of the present invention is to provide a light emitting apparatus capable of inhibiting deformation of mirror units and obtaining a uniform irradiation distribution in an irradiation region.

Means for Solving the Problems

To achieve the aforementioned object, a light emitting apparatus of the present invention includes: a light source; a thin plate-shaped mirror unit which guides light from the light source; and a tension imparting means which imparts tension to the mirror unit.

With this configuration, the tension is always imparted to the mirror unit, and thus the mirror unit remains taut, such that it is possible to inhibit deformation of the mirror unit.

The tension imparting means may have at least any one of a first tension imparting mechanism which imparts tension in a first direction toward the light source along a surface of the mirror unit and a second tension imparting mechanism which imparts tension in a second direction opposite to the first direction.

The first tension imparting mechanism may have a first biasing means which biases an end in the first direction of the mirror unit in the first direction, and the second tension imparting mechanism may have a second biasing means which biases an end in the second direction of the mirror unit in the second direction.

The first biasing means and the second biasing means may be disposed at a rear side of an effective reflecting surface of the mirror unit. In addition, the first biasing means and the second biasing means each may be a compressive spring, a tension spring, or a flat spring.

The tension imparting mechanism may have at least any one of a third tension imparting mechanism which imparts tension in a third direction in parallel with the light source along a surface of the mirror unit and a fourth tension imparting mechanism which imparts tension in a fourth direction opposite to the third direction.

The third tension imparting mechanism may have a third biasing means which biases an end in the third direction of the mirror unit in the third direction, and the fourth tension imparting mechanism may have a fourth biasing means which biases an end in the fourth direction of the mirror unit in the fourth direction.

The third biasing means and the fourth biasing means may be disposed at a rear side of an effective reflecting surface of the mirror unit.

The third biasing means and the fourth biasing means may be disposed outside an effective reflecting surface of the mirror unit.

The third biasing means and the fourth biasing means each may be a compressive spring, a tension spring, or a flat spring.

The tension imparting mechanism may have a fifth tension imparting mechanism which imparts tension outward in a diagonal direction along a surface of the mirror unit.

The fifth tension imparting mechanisms may be disposed at four corners of the mirror unit and may have fifth biasing means which bias the four corners of the mirror unit outward in the diagonal direction.

The fifth biasing means may be disposed at a rear side of an effective reflecting surface of the mirror unit.

The fifth biasing means may be a compressive spring, a tension spring, or a flat spring.

The multiple mirror units may be provided to surround the light source.

At least some of the multiple mirror units may be inclined with respect to an optical axis of the light source.

The light source may have a substrate, and a light emitting element disposed on a surface of the substrate.

Light emitted from the light source may be light having a wavelength in an ultraviolet region.

Effects of the Invention

According to the present invention as described above, it is possible to inhibit the deformation of the mirror units, and as a result, it is possible to implement the light emitting apparatus capable of obtaining the uniform irradiation distribution in the irradiation region.

BEST MODES FOR CARRYING OUT THE INVENTION

Hereinafter, exemplary embodiments of the present invention will be described in detail with reference to the drawings. Further, in the drawings, the same or similar constituent elements are designated by the same reference numerals, and a description of thereof will be omitted.

First Exemplary Embodiment

Figure 1A:
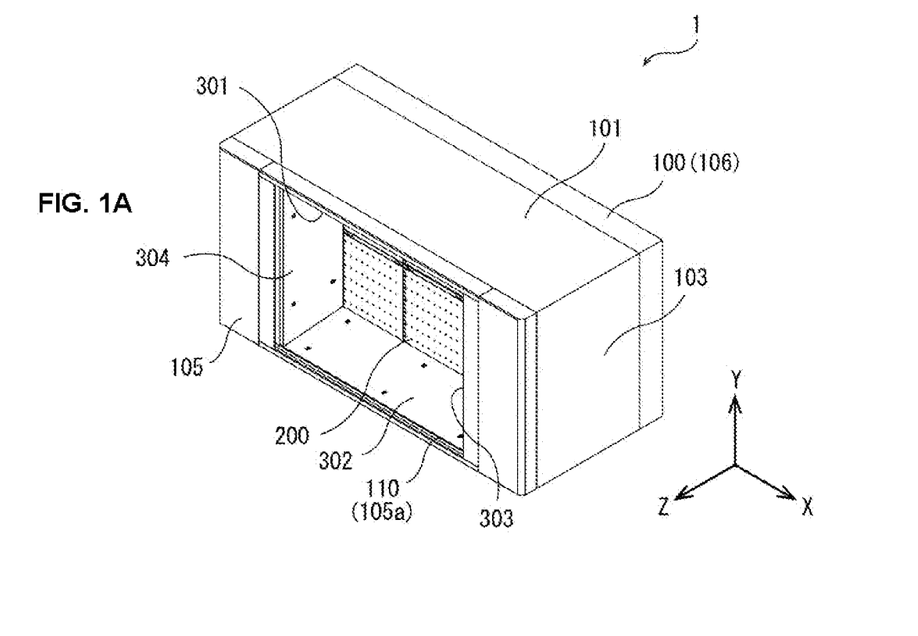
FIG. 1A and FIG. 1B are views for explaining a schematic configuration of a light emitting apparatus according to a first exemplary embodiment of the present invention.
Figure 1B:
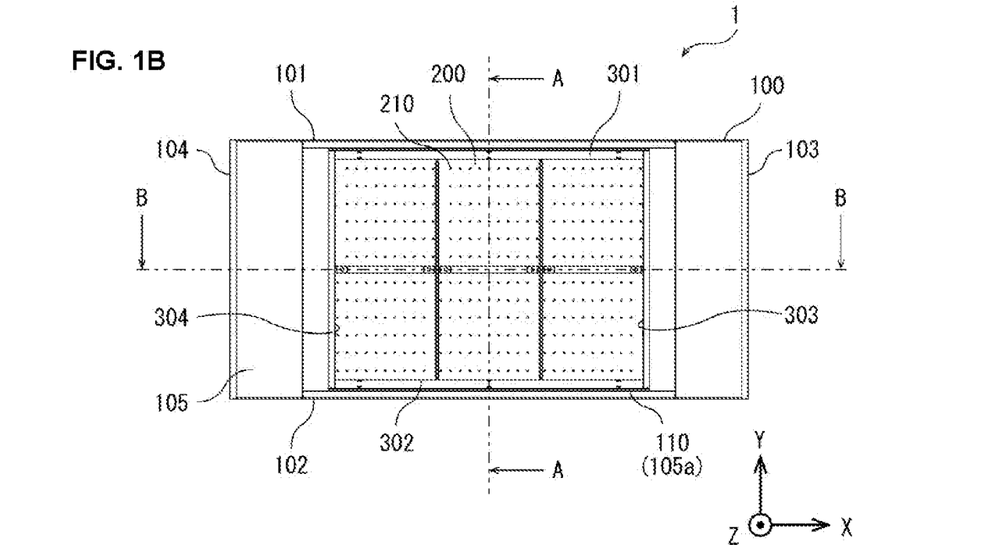
Figure 2:
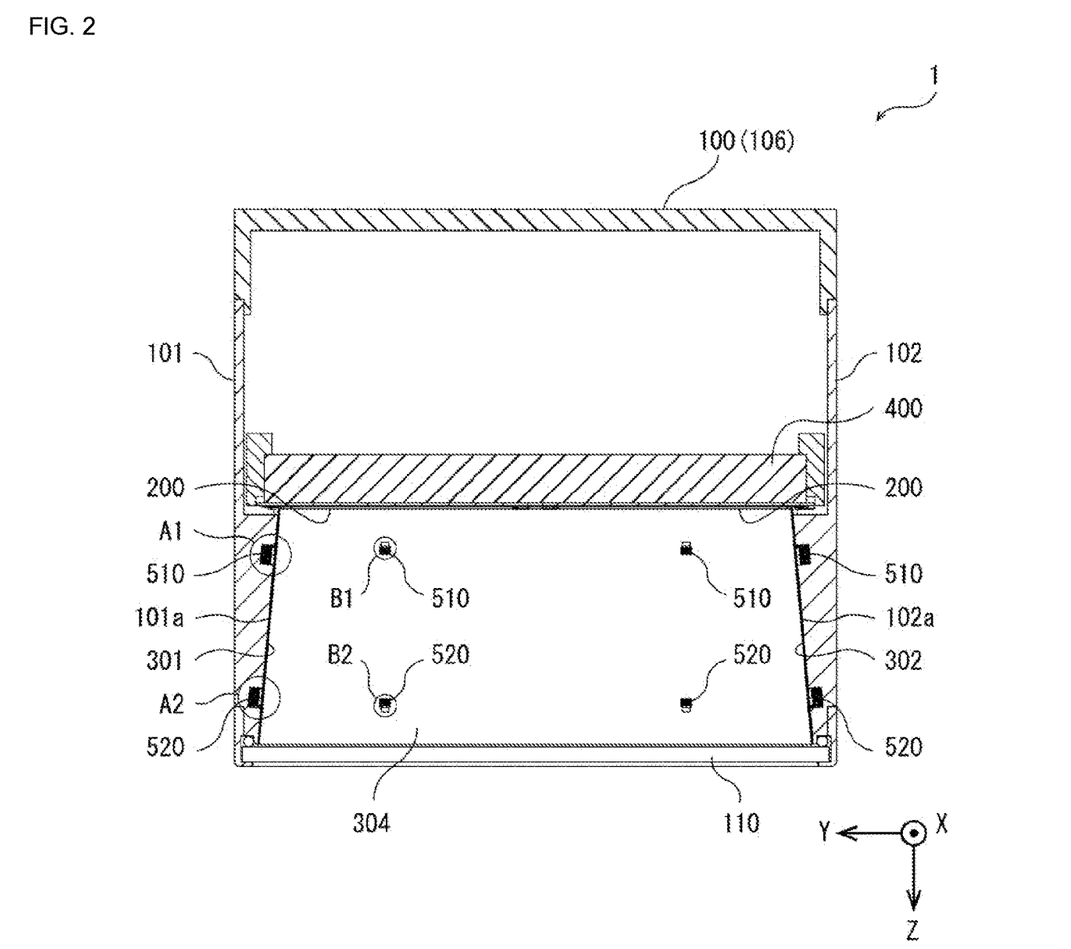
FIG. 2 is a view for explaining an internal configuration of the light emitting apparatus according to the first exemplary embodiment of the present invention.

FIG. 1 is a view for explaining a schematic configuration of a light emitting apparatus 1 according to a first exemplary embodiment of the present invention, in which FIG. 1A is a perspective view, and FIG. 1B is a front view. In addition, FIG. 2 is a view for explaining an internal configuration of the light emitting apparatus 1, that is, a cross-sectional view taken along line A-A in FIG. 1B. The light emitting apparatus 1 according to the present exemplary embodiment is a light source apparatus which is provided in a printing apparatus or the like and cures ultraviolet ray curable ink or ultraviolet ray curable resin. For example, the light emitting apparatus 1 is disposed above an irradiation object so that a front side (a side where a window unit 110 is disposed) of the light emitting apparatus 1 faces the irradiation object, and the light emitting apparatus 1 emits ultraviolet light downward toward the irradiation object. Further, in the present specification, as illustrated in FIGS. 1 and 2, a direction in which light emitting diode (LED) elements 210 to be described below emit the ultraviolet light is defined as a Z-axis direction, a longitudinal direction of the light emitting apparatus 1 is defined as an X-axis direction, and a direction (transverse direction of the light emitting apparatus 1) orthogonal to the Z-axis direction and the X-axis direction is defined as a Y-axis direction. In addition, the ultraviolet light generally means light having a wavelength of 400 nm or less, but in the present specification, the ultraviolet light means light having a wavelength capable of curing the ultraviolet ray curable ink (e.g., a wavelength of 250 to 420 nm).

As illustrated in FIGS. 1 and 2, the light emitting apparatus 1 according to the present exemplary embodiment has therein six LED modules 200, reflecting mirrors 301, 302, 303, and 304 (mirror units), a heat dissipation member 400, and a metallic box-shaped casing 100 which accommodates these components. The casing 100 has an upper panel 101, a lower panel 102, a right panel 103, a left panel 104, a front panel 105, and a rear panel 106. A rectangular opening 105a is formed at a nearly central portion of the front panel 105, and the glass window unit 110, through which the ultraviolet light exits, is provided in the opening 105a. Further, a connector (not illustrated) and the like for supplying electric power to the light emitting apparatus 1 are installed on the rear panel 106 of the present exemplary embodiment, and the electric power is supplied to the light emitting apparatus 1 through the connector.

Figure 3:
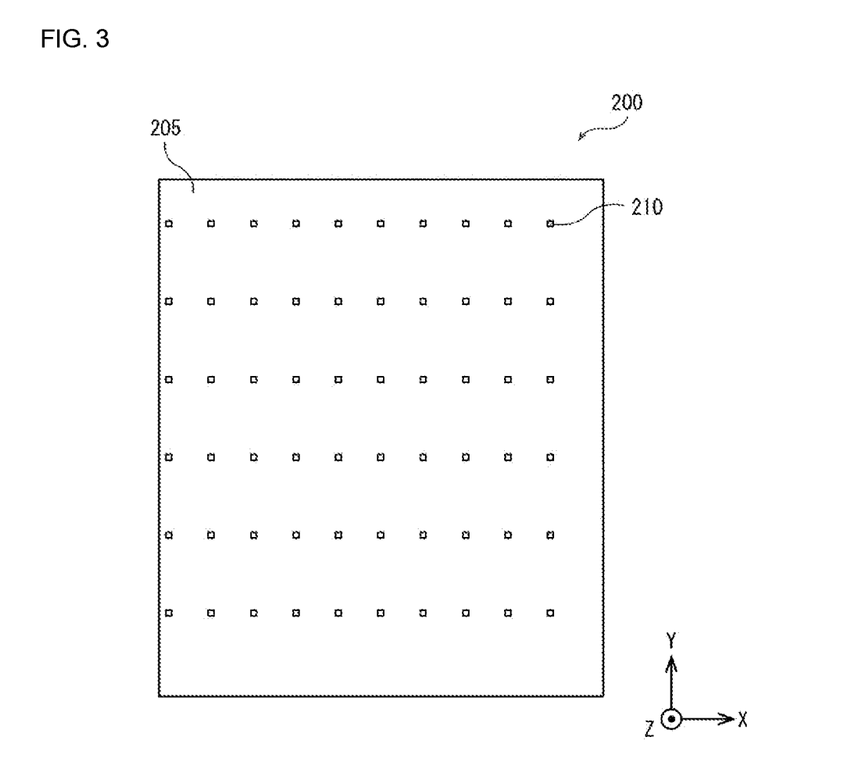
FIG. 3 is a view for explaining a configuration of an LED module provided in the light emitting apparatus according to the first exemplary embodiment of the present invention.

FIG. 3 is a view for explaining a configuration of the LED module 200 of the present exemplary embodiment. As illustrated in FIG. 3, the LED module 200 has a rectangular substrate 205 which is in parallel with the X-axis direction and the Y-axis direction, and multiple LED elements 210 which are provided on the substrate 205. The three LED modules 200 are disposed and fixed in each of the two rows at one end side (a side directed toward a front side of the casing 100) of the heat dissipation member 400 (FIG. 1B).

As illustrated in FIG. 3, the LED module 200 of the present exemplary embodiment has the sixty LED elements 210 which are disposed such that the ten LED elements 210 (X-axis direction) are disposed in each of the six rows (Y-axis direction) on the substrate 205. The sixty LED elements 210 are disposed on a surface of the substrate 205 in a state in which an optical axis is aligned with the Z-axis direction. An anode pattern (not illustrated) and a cathode pattern (not illustrated) are formed on the substrate 205 in order to supply electric power to the respective LED elements 210, and each of the LED elements 210 is soldered and electrically connected to the anode pattern and the cathode pattern. In addition, the substrate 205 is electrically connected to a non-illustrated driver circuit through a non-illustrated wiring cable, and each of the LED elements 210 is configured to be supplied with a drive current from the driver circuit through the anode pattern and the cathode pattern. When the drive current is supplied to each of the LED elements 210, each of the LED elements 210 emits ultraviolet light (e.g., light having a wavelength of 385 nm) with a light quantity in accordance with the drive current. Further, in the case of each of the LED elements 210 of the present exemplary embodiment, the drive current to be supplied to each of the LED elements 210 is adjusted to emit the ultraviolet light with approximately the same light quantity, and the ultraviolet light emitted from the light emitting apparatus 1 has an approximately uniform light intensity distribution in the X-axis direction and the Y-axis direction.

The reflecting mirrors 301, 302, 303, and 304 are members each formed in the form of an aluminum thin plate (e.g., a plate having a thickness of 1 mm) having a mirror-finished surface. As illustrated in FIG. 2, an inclined surface 101a, which is inclined with respect to the optical axis (e.g., Z axis) of each of the LED elements 210, is formed at a portion of the upper panel 101 of the present exemplary embodiment between the LED modules 200 and the window unit 110, and the reflecting mirror 301, which extends in the X-axis direction, is mounted on the inclined surface 101a. In addition, similarly, an inclined surface 102a, which is inclined with respect to the optical axis (e.g., Z axis) of each of the LED elements 210, is formed at a portion of the lower panel 102 between the LED modules 200 and the window unit 110, and the reflecting mirror 302, which extends in the X-axis direction, is mounted on the inclined surface 102a.

Figure 4:
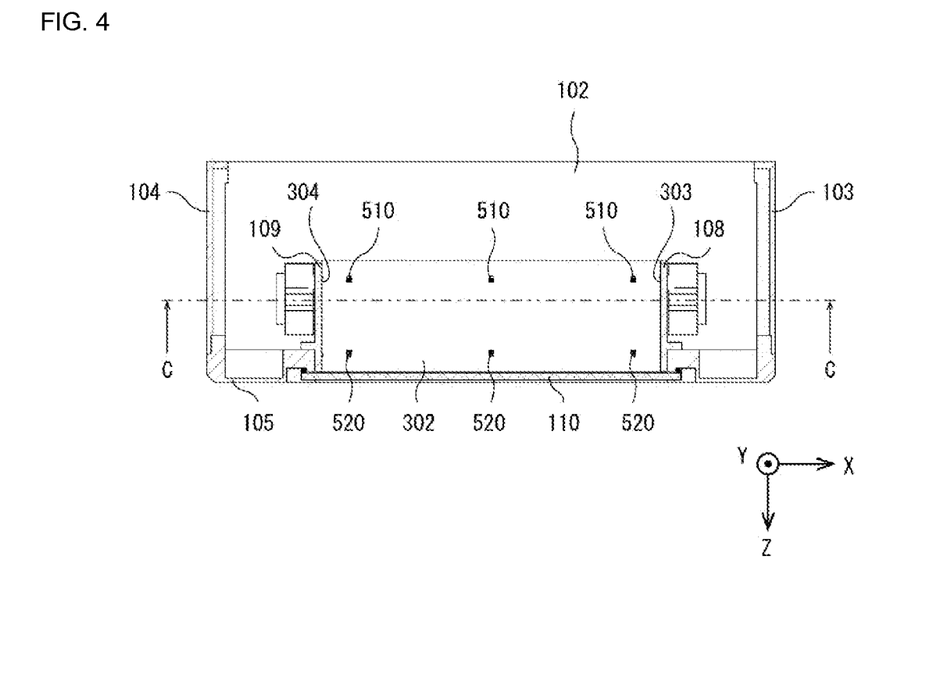
FIG. 4 is a view for explaining a disposition of reflecting mirrors provided in the light emitting apparatus according to the first exemplary embodiment of the present invention.
Figure 5:
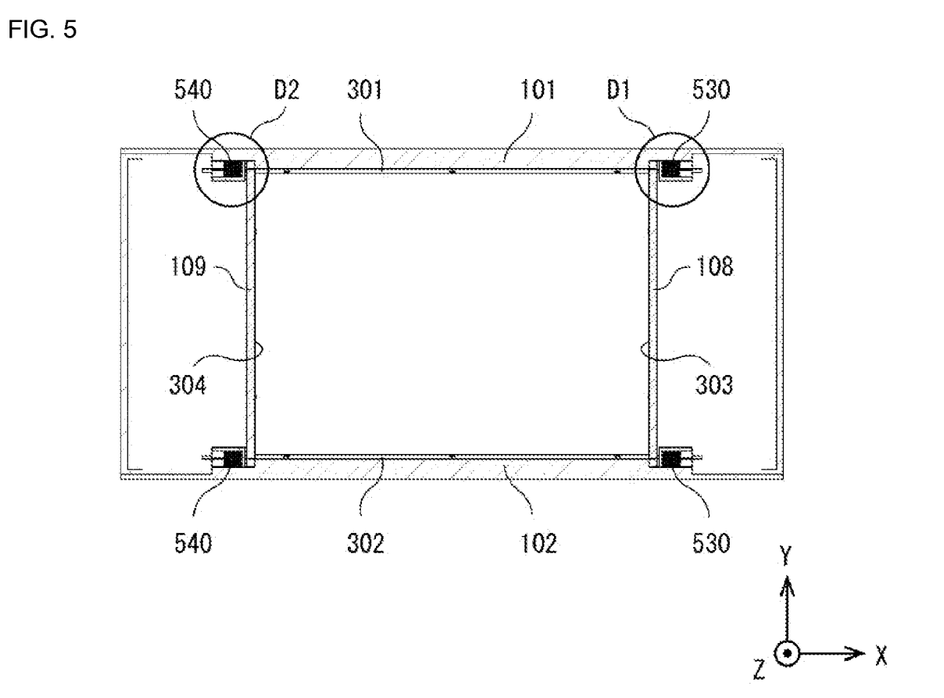
FIG. 5 is a cross-sectional view taken along line C-C in FIG. 4.

FIGS. 4 and 5 are views for explaining a disposition of the reflecting mirrors 301, 302, 303, and 304, in which FIG. 4 is a cross-sectional view taken along line B-B in FIG. 1B, and FIG. 5 is a cross-sectional view taken along line C-C in FIG. 4. Further, in FIGS. 4 and 5, for convenience of description, the LED modules 200, the heat dissipation member 400, the rear panel 106, and the like are omitted. As illustrated in FIGS. 4 and 5, wall portions 108 and 109, which are in parallel with a Y-Z plane, are formed in the casing 100 between the reflecting mirror 301 and the reflecting mirror 302, the reflecting mirror 303 is mounted on a surface at an inner side of the wall portion 108 (a side facing the wall portion 109), and the reflecting mirror 304 is mounted on a surface at an inner side of the wall portion 109 (a side facing the wall portion 108). Further, in the present exemplary embodiment, lengths of the reflecting mirrors 301 and 302 (lengths in the X-axis direction) are sufficiently longer than lengths of the reflecting mirrors 303 and 304 (lengths in the Y-axis direction).

As described above, the reflecting mirror 301 is disposed on the inclined surface 101a of the upper panel 101, the reflecting mirror 302 is disposed on the inclined surface 102a of the lower panel 102, the reflecting mirror 303 is disposed inside the wall portion 108, and the reflecting mirror 304 is disposed inside the wall portion 109, such that the LED modules 200, which are disposed such that the three LED modules 200 are disposed in each of the two rows, are surrounded (i.e., a light passage region through which the light from the LED elements 210 passes is surrounded) by the reflecting mirrors 301, 302, 303, and 304. For this reason, the ultraviolet light emitted from each of the respective LED elements 210 is mixed by the four reflecting mirrors 301, 302, 303, and 304, such that a more uniform light intensity distribution is implemented on the irradiation object.

Referring back to FIG. 2, the heat dissipation member 400 is a member for fixing the respective LED modules 200 and dissipating heat generated from the respective LED modules 200, and the heat dissipation member 400 is made of metal such as copper having high thermal conductivity. For example, the heat dissipation member 400 is a water-cooled heat sink having therein multiple water channels (not illustrated) through which a coolant passes. In addition, in another exemplary embodiment, an air-cooled heat sink having multiple heat dissipation fins (not illustrated) may be applied as the heat dissipation member 400.

As described above, the four reflecting mirrors 301, 302, 303, and 304 of the present exemplary embodiment are members for mixing the ultraviolet light exiting from each of the LED elements 210. When the ultraviolet light from each of the LED elements 210 is mixed by the reflecting mirrors 301, 302, 303, and 304, a uniform light intensity distribution is obtained on the irradiation object.

However, when the ultraviolet light from each of the LED elements 210 reaches each of the reflecting mirrors 301, 302, 303, and 304, a part of the light absorbed into each of the reflecting mirrors 301, 302, 303, and 304 is converted into heat, which causes a problem in that the reflecting mirrors 301, 302, 303, and 304 are heated to a high temperature and thermally deformed. Further, when the reflecting mirrors 301, 302, 303, and 304 are deformed, there are problems in that a light quantity corresponding to a design value cannot be obtained on the irradiation object and a uniform light intensity distribution cannot also be obtained. Therefore, to solve the aforementioned problems, in the present exemplary embodiment, the reflecting mirrors 301, 302, 303, and 304 are fixed in a state in which tension is imparted to the reflecting mirrors 301, 302, 303, and 304 in order to inhibit the deformation of the reflecting mirrors 301, 302, 303, and 304.

Figure 6:
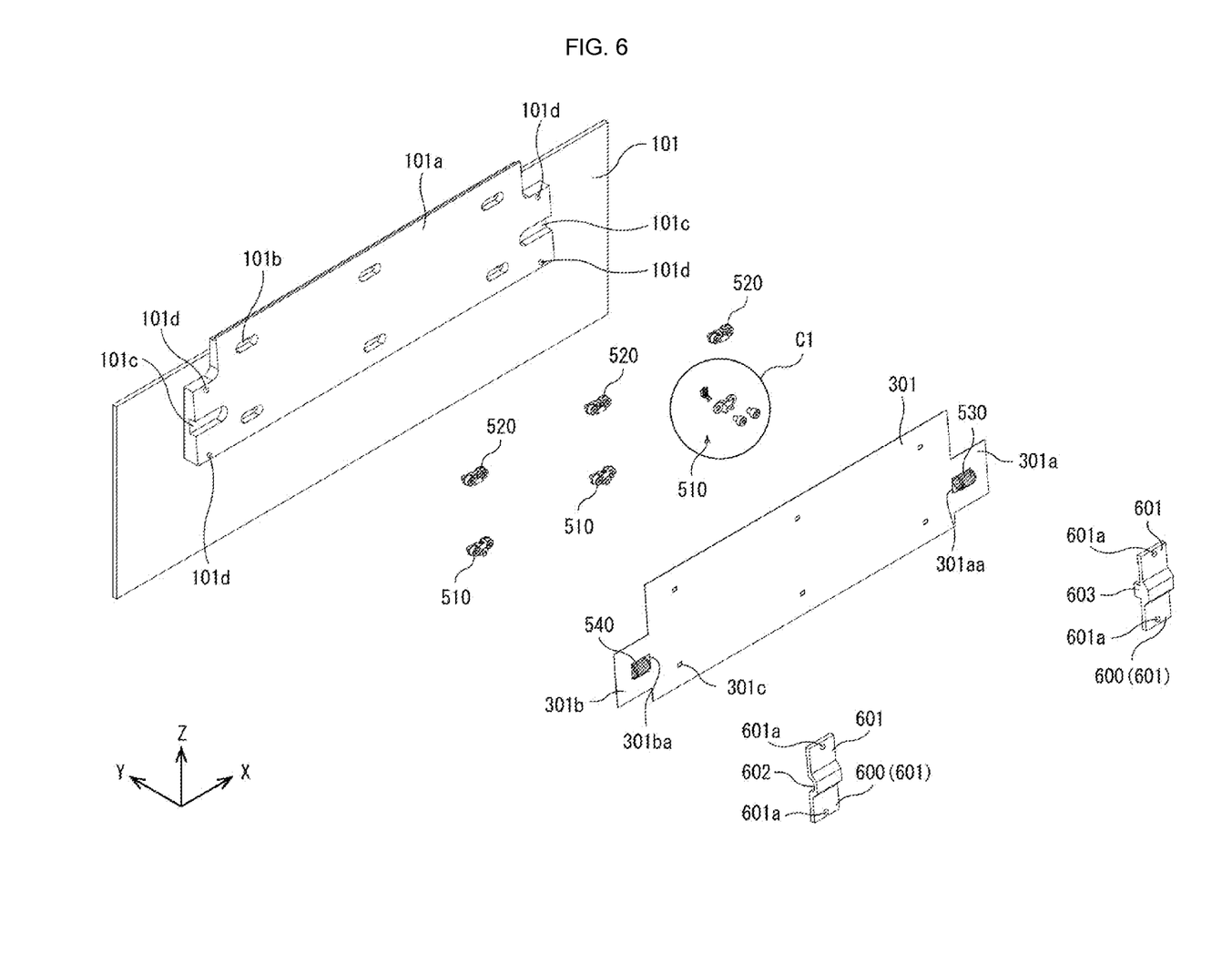
FIG. 6 is an exploded perspective view for explaining a configuration of a tension imparting mechanism provided in the light emitting apparatus according to the first exemplary embodiment of the present invention.
Figure 7:
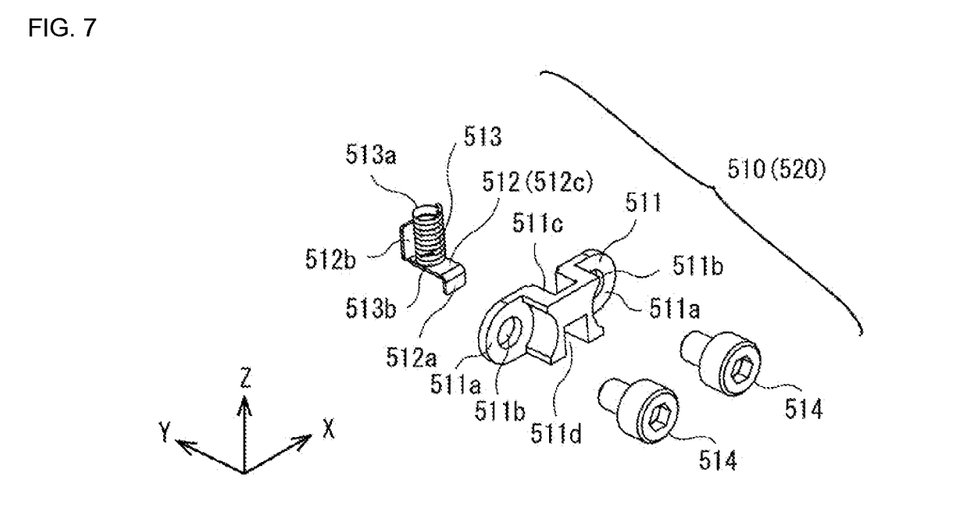
FIG. 7 is an enlarged view of part C1 in FIG. 6.
Figure 8A:
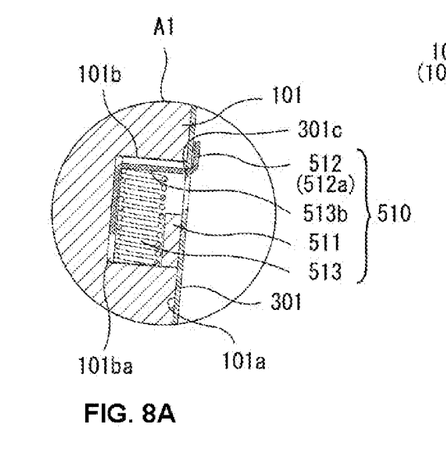
FIG. 8A and FIG. 8B are enlarged views for explaining a configuration of the tension imparting mechanism provided in the light emitting apparatus according to the first exemplary embodiment of the present invention.
Figure 8B:
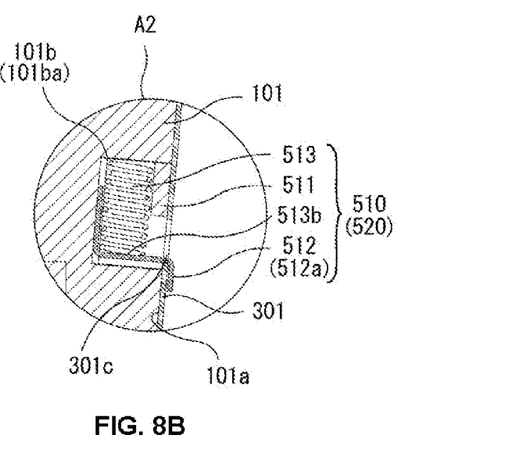

FIG. 6 is an exploded perspective view for explaining configurations of tension imparting mechanisms 510, 520, 530, and 540 (tension imparting means) that impart tension to the reflecting mirror 301. In addition, FIG. 7 is an enlarged view of part C1 in FIG. 6. In addition, FIG. 8 is a view for explaining configurations of the tension imparting mechanisms 510 and 520, in which FIG. 8A is an enlarged view of part A1 in FIG. 2, and FIG. 8B is an enlarged view of part A2 in FIG. 2. Further, because a configuration for imparting tension to the reflecting mirror 302 is identical to the configuration for imparting tension to the reflecting mirror 301, the description of the configuration for imparting tension to the reflecting mirror 302 is omitted. In addition, as illustrated in FIG. 8, tension imparting directions of the tension imparting mechanisms 510 and 520 are different from each other by 180°, but the tension imparting mechanisms 510 and 520 have the same configuration. Therefore, only the tension imparting mechanism 510 will be described representatively, and the tension imparting mechanism 520 will be described as necessary by equally using the reference numerals of the tension imparting mechanism 510.

As illustrated in FIG. 6, in the present exemplary embodiment, six concave portions 101*b*, which are disposed such that the three concave portions 101*b* (X-axis direction) are disposed in each of the two rows (Z-axis direction), are formed in the inclined surface 101*a* of the upper panel 101. The tension imparting mechanisms 510 are accommodated in the three inner concave portions 101*b* (disposed at a side in a negative direction of the Z axis (i.e., directed toward the LED modules 200)), and the tension imparting mechanisms 520 are accommodated and mounted in the three outer concave portions 101*b* (disposed at a side in a positive direction of the Z axis (i.e., directed toward the window unit 110)). In addition, concave portions 101*c* for accommodating the tension imparting mechanisms 530 and 540 are formed at both ends, in the X-axis direction, of the inclined surface 101*a* of the upper panel 101. In addition, a pair of screw holes 101*d* for fixing a spring holder 600 is formed at an outer side (a side in the positive direction of the Z axis (i.e., a side directed toward the window unit 110)) and an inner side (a side in the negative direction of the Z axis (i.e., a side directed toward the LED module 200)) based on each of the concave portions 101*c*.

As illustrated in FIG. 7, the tension imparting mechanism 510 (first tension imparting mechanism) includes a spring holder 511, a biasing metal fitting 512, a compressive spring 513 (first biasing means), and fixing screws 514.

The spring holder 511 is a metallic member for accommodating the biasing metal fitting 512 and the compressive spring 513, and has a nearly oval shape when viewed in the Y-axis direction. A pair of flange portions 511*a* is formed at both ends, in the X-axis direction, of the spring holder 511, and through holes 511*b* into which the fixing screws 514 are penetratively inserted are formed in the flange portions 511*a*, respectively. In addition, a groove portion 511*c* for accommodating the compressive spring 513 is formed in the Z-axis direction between the pair of flange portions 511*a*. In addition, a groove portion 511*d* for accommodating the biasing metal fitting 512 is formed in the Y-axis direction between the pair of flange portions 511*a*.

The biasing metal fitting 512 is a member formed by bending a metal plate in a hook shape, a tip portion 512*a* of the biasing metal fitting 512 is bent in the negative direction of the Z axis, a base end 512*b* of the biasing metal fitting 512 is bent in the positive direction of the Z axis, and an intermediate portion 512*c* is formed between the tip portion 512*a* and the base end 512*b*.

The compressive spring 513 is a metallic compressive spring having one end 513*a* and the other end 513*b*, a central axis of the compressive spring 513 is disposed in the Z-axis direction, and the other end 513*b* is in contact with the intermediate portion 512*c* of the biasing metal fitting 512 (at a side in the positive direction of the Z axis).

As illustrated in FIG. 6, a screw hole (not illustrated), which is coupled to the fixing screw 514 by a threaded engagement, is formed in each of the concave portions 101*b* in the inclined surface 101*a* of the upper panel 101, and each of the tension imparting mechanisms 510 is fixed by the fixing screws 514 which are penetratively inserted into the through holes 511*b*. Further, as illustrated in FIG. 8A, when the tension imparting mechanism 510 is accommodated and fixed in the concave portion 101*b*, the compressive spring 513 in a compressed state is fitted between a wall surface 101*ba* of the concave portion 101*b* and the biasing metal fitting 512, such that the biasing metal fitting 512 is biased toward the side in the negative direction of the Z axis (i.e., toward the side directed toward the LED module 200). That is, one end 513*a* of the compressive spring 513 comes into contact with the wall surface 101*ba* of the concave portion 101*b*, such that the biasing metal fitting 512, which is in contact with the other end 513*b* of the compressive spring 513, is biased toward the side in the negative direction of the Z axis (i.e., the side directed toward the LED module 200).

As illustrated in FIG. 8B, the tension imparting mechanism 520 (second tension imparting mechanism) has a shape made by rotating the tension imparting mechanism 510 about the Y axis by 180°. When the tension imparting mechanism 510 is accommodated and fixed in the concave portion 101*b*, the biasing metal fitting 512, which is in contact with the other end 513*b* of the compressive spring 513 (second biasing means), is biased toward the side in the positive direction of the Z axis (i.e., toward the side directed toward the window unit 110).

Referring back to FIG. 6, rectangular through holes 301*c*, which may engage with the tip portions 512*a* of the tension imparting mechanisms 510 and 520, respectively, are formed in the reflecting mirror 301 of the present exemplary embodiment so as to correspond to positions of the respective tip portions 512*a*. That is, the three through holes 301*c* are formed at an end of the reflecting mirror 301, which is directed toward the LED module 200, so as to correspond to the positions of the respective tip portions 512*a* of the tension imparting mechanism 510, and the three through holes 301*c* are formed at an end, which is directed toward the window unit 110, so as to correspond to the positions of the respective tip portions 512*a* of the tension imparting mechanism 520. To mount the reflecting mirror 301 on the upper panel 101, the reflecting mirror 301 is placed on the inclined surface 101*a* of the upper panel 101, and the tip portions 512*a* of the biasing metal fittings 512 of the respective tension imparting mechanisms 510 and 520 are moved first in a direction opposite to the biasing direction. Further, when the tip portion 512*a* penetrates the through hole 301*c* and is exposed to the surface of the reflecting mirror 301, the tip portion 512*a* is moved in the biasing direction so that the tip portion 512*a* is caught by the reflecting mirror 301. That is, when the reflecting mirror 301 is mounted on the upper panel 101, the tip portions 512*a* of the respective biasing metal fittings 512 are exposed to the surface of the reflecting mirror 301 and engage with the respective through holes 301*c* as illustrated in FIGS. 8A and 8B, such that ends of the through holes 301*c* are biased.

As described above, in the present exemplary embodiment, the tension imparting mechanisms 510 and 520 are disposed at a rear side of an effective reflecting surface of the reflecting mirror 301 and engage with the through holes 301*c*, and as a result, tension directed toward the LED module 200 is generated in the through holes 301*c* (i.e., ends directed toward the LED module 200) which engage with the tension imparting mechanisms 510, and tension directed toward the window unit 110 is generated in the through holes 301*c* (i.e., ends directed toward the window unit 110) which engage with the tension imparting mechanisms 520. That is, the tension directed toward the LED module 200 and the tension directed toward the window unit 110 (i.e., the tension in a direction opposite to the direction of the tension directed toward the LED module 200) are always imparted to the reflecting mirror 301 along the reflecting mirror 301, such that the reflecting mirror 301 always remains taut.

As illustrated in FIG. 6, the reflecting mirror 301 is formed with a protruding portion 301*a* which protrudes in a rectangular shape in a positive direction of the X axis, and a protruding portion 301b which protrudes in a rectangular shape in a negative direction of the X axis. A rectangular through hole 301aa is formed in the protruding portion 301a, and the tension imparting mechanism 530 (third tension imparting mechanism, third biasing means) is disposed in the through hole 301aa. In addition, a rectangular through hole 301ba is formed in the protruding portion 301b, and the tension imparting mechanism 540 (fourth tension imparting mechanism, fourth biasing means) is disposed in the through hole 301ba. Further, the protruding portions 301a and 301b of the reflecting mirror 301 are positioned outside the wall portions 108 and 109 in the casing 100 (i.e., outside the effective reflecting surface of the reflecting mirror 301) (FIG. 5).

Figure 9A:
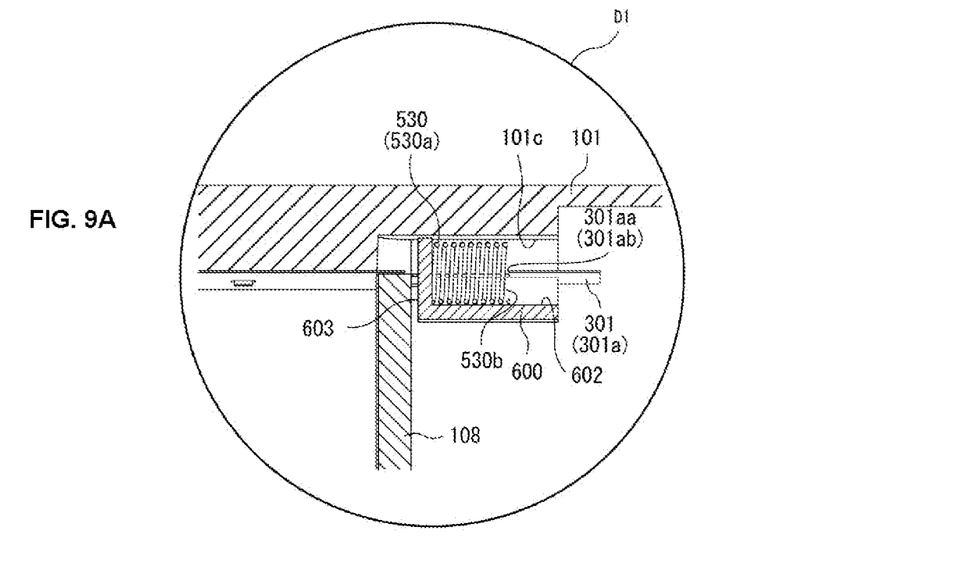
FIGS. 9A and 9B are enlarged views for explaining a configuration of the tension imparting mechanism provided in the light emitting apparatus according to the first exemplary embodiment of the present invention.
Figure 9B:
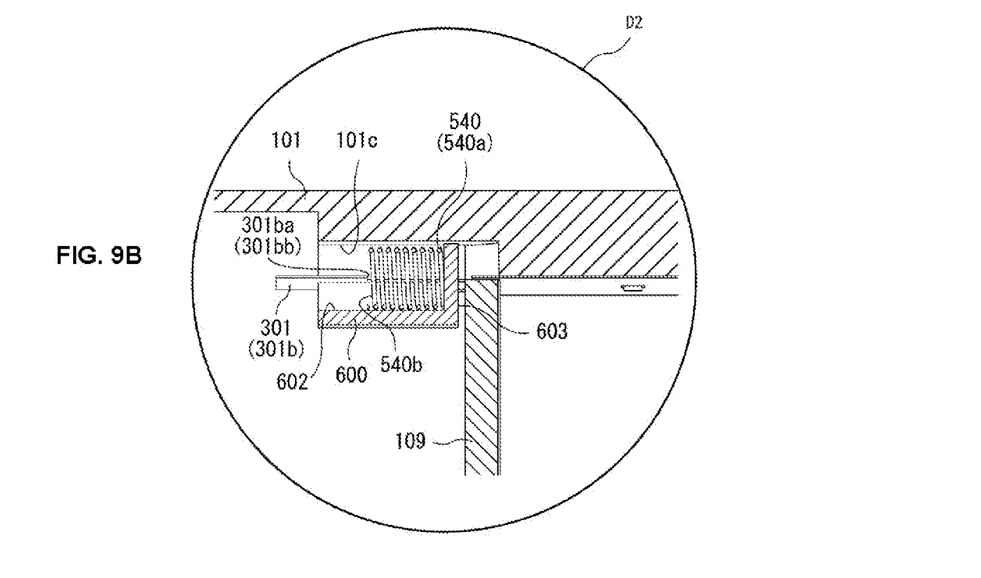

FIG. 9 is a view for explaining configurations of the tension imparting mechanisms 530 and 540, in which FIG. 9A is an enlarged view of part D1 in FIG. 5, and FIG. 9B is an enlarged view of part D2 in FIG. 5.

As illustrated in FIG. 9, each of the tension imparting mechanisms 530 and 540 of the present exemplary embodiment is configured by a metallic compressive spring. When the reflecting mirror 301 is mounted on the inclined surface 101a of the upper panel 101 (i.e., fixed by the respective tension imparting mechanisms 510 and 520), the through holes 301aa and 301ba of the reflecting mirror 301 are disposed above the concave portions 101c of the inclined surface 101a, respectively. In this state, the tension imparting mechanisms 530 and 540 are disposed in the through holes 301aa and 301ba and fixed in the concave portions 101c by mounting the spring holders 600 (FIGS. 6 and 9). As illustrated in FIG. 9, tension imparting directions of the tension imparting mechanisms 530 and 540 are different from each other by 180°, but the tension imparting mechanisms 530 and 540 have the same configuration. Therefore, the tension imparting mechanism 530 will be described representatively.

The spring holder 600 is a metallic member for accommodating the tension imparting mechanism 530 and has a nearly rectangular shape as illustrated in FIG. 6 when viewed in the Y-axis direction. A pair of flange portions 601 is formed at both ends, in the Y-axis direction, of the spring holder 600, and through holes 601a into which non-illustrated fixing screws are penetratively inserted are formed in the flange portions 601, respectively. Further, the non-illustrated fixing screws penetrate the through holes 601a and are fixed to the screw holes 101d of the inclined surface 101a of the upper panel 101, such that the spring holders 600 are fixed on the inclined surface 101a. In addition, a groove portion 602 for accommodating the tension imparting mechanism 530 is formed in the X-axis direction between the pair of flange portions 601 (FIGS. 6 and 9). In addition, an engaging portion 603, which protrudes in the Y-axis direction and engages with the concave portion 101c, is formed at a base end of the groove portion 602.

As illustrated in FIG. 9A, the spring holder 600 accommodates the tension imparting mechanism 530 and is mounted to cover the concave portion 101c of the inclined surface 101a of the upper panel 101. Further, when the spring holder 600 is mounted, the engaging portion 603 penetrates the through hole 301aa of the reflecting mirror 301 and engages with the concave portion 101c. Further, when the spring holder 600 is mounted, the tension imparting mechanism 530 is fitted, in a compressed state, between the engaging portion 603 and an end 301ab of the through hole 301aa, and biases the end 301ab of the through hole 301aa of the reflecting mirror 301 in the positive direction of the X axis. That is, one end 530a of the tension imparting mechanism 530 comes into contact with the engaging portion 603, and the other end 530b of the tension imparting mechanism 530 comes into contact with the end 301ab of the through hole 301aa, such that tension is imparted to the reflecting mirror 301 in the positive direction of the X axis.

As illustrated in FIG. 9B, the tension imparting mechanism 540 has a shape made by rotating the tension imparting mechanism 530 about the Y axis by 180°, and the spring holder 600 accommodates the tension imparting mechanism 530 and is mounted to cover the concave portion 101c of the inclined surface 101a of the upper panel 101. Further, when the spring holder 600 is mounted, the engaging portion 603 penetrates the through hole 301ba of the reflecting mirror 301 and engages with the concave portion 101c. Further, when the spring holder 600 is mounted, the tension imparting mechanism 540 is fitted, in a compressed state, between the engaging portion 603 and an end 301bb of the through hole 301ba, and biases the end 301bb of the through hole 301ba of the reflecting mirror 301 in the negative direction of the X axis. That is, one end 540a of the tension imparting mechanism 540 comes into contact with the engaging portion 603, and the other end 540b of the tension imparting mechanism 540 comes into contact with the end 301bb of the through hole 301ba, such that tension is imparted to the reflecting mirror 301 in the negative direction of the X axis.

As described above, in the present exemplary embodiment, the tension is imparted by the tension imparting mechanism 530 to the reflecting mirror 301 in the positive direction of the X axis, and the tension is imparted by the tension imparting mechanism 540 to the reflecting mirror 301 in the negative direction of the X axis. Therefore, the tension is always imparted to the reflecting mirror 301 in the positive and negative directions of the X axis, such that the reflecting mirror 301 always remains taut in the X-axis direction.

Figure 10:
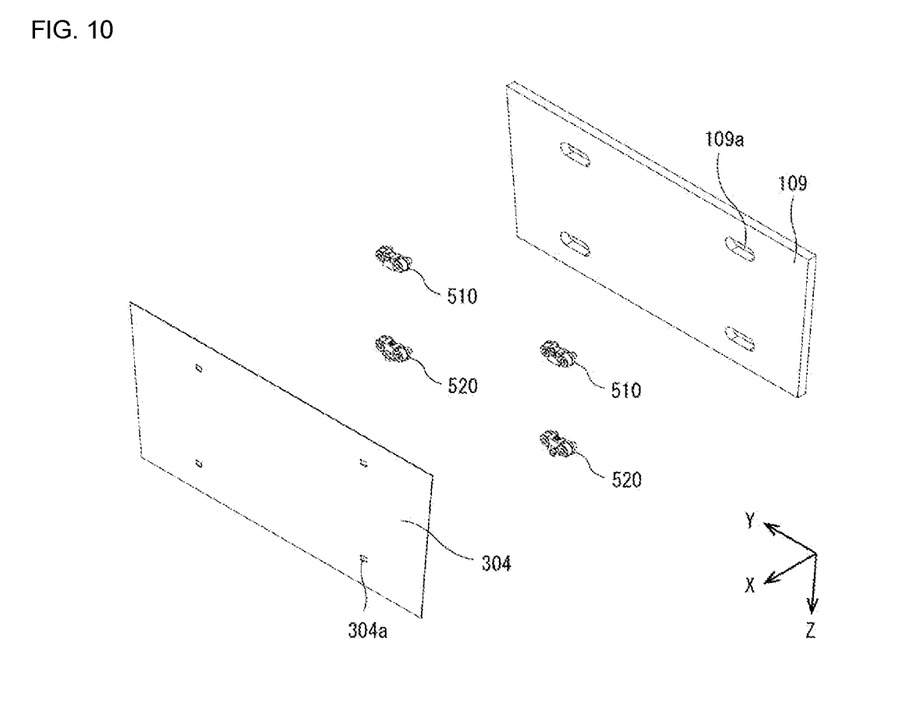
FIG. 10 is an exploded perspective view for explaining a configuration of the tension imparting mechanism provided in the light emitting apparatus according to the first exemplary embodiment of the present invention.
Figure 11A:
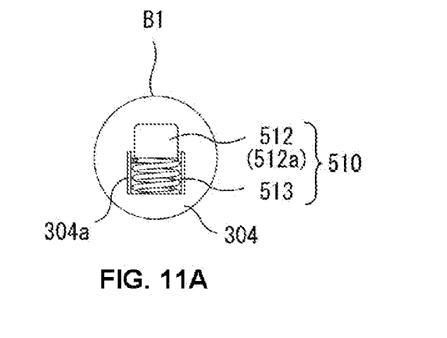
FIG. 11A and FIG. 11B are enlarged views for explaining a configuration of the tension imparting mechanism provided in the light emitting apparatus according to the first exemplary embodiment of the present invention.
Figure 11B:
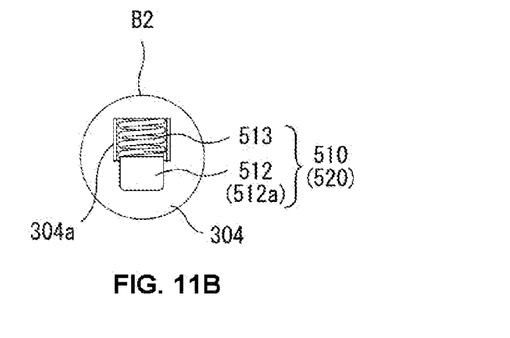

FIGS. 10 and 11 are views for explaining a configuration for imparting tension to the reflecting mirror 304, in which FIG. 10 is an exploded perspective view of a periphery of the reflecting mirror 304, FIG. 11A is an enlarged view of part B1 in FIG. 2, and FIG. 11B is an enlarged view of part B2 in FIG. 2. Further, because a configuration for imparting tension to the reflecting mirror 303 is identical to the configuration for imparting tension to the reflecting mirror 304, the description of the configuration for imparting tension to the reflecting mirror 303 is omitted.

As illustrated in FIG. 10, in the present exemplary embodiment, four concave portions 109a, which are disposed such that the two concave portions 109a (Y-axis direction) are disposed in each of the two rows (Z-axis direction), are formed in a surface inside the wall portion 109 (at a side facing the wall portion 108). The tension imparting mechanisms 510 are accommodated in the two inner concave portions 109a (disposed at a side in a negative direction of a Z axis), and the tension imparting mechanisms 520 are accommodated in the two outer concave portions 109a (disposed at a side in a positive direction of the Z axis). Further, the configuration of the concave portion 109a of the wall portion 109 is the same as the configuration of the concave portion 101b of the inclined surface 101a of the upper panel 101, and the configurations of the tension imparting mechanisms 510 and 520 mounted in the concave portions 109a of the wall portion 109 are the same as the configurations of the tension imparting mechanisms 510 and 520 mounted in the concave portions 101b of the inclined surface 101a of the upper panel 101.

As illustrated in FIG. 10, rectangular through holes 304a, which may engage with the tip portions 512a of the tension imparting mechanisms 510 and 520, respectively, are formed in the reflecting mirror 304 of the present exemplary embodiment so as to correspond to the positions of the respective tip portions 512a. To mount the reflecting mirror 304 on the wall portion 109, the reflecting mirror 304 is placed on the surface inside the wall portion 109, and the tip portions 512a of the biasing metal fittings 512 of the respective tension imparting mechanisms 510 and 520 are moved first in a direction opposite to the biasing direction. Further, when the tip portion 512a penetrates the through hole 304a and is exposed to the surface of the reflecting mirror 304, the tip portion 512a is moved in the biasing direction so that the tip portion 512a is caught by the reflecting mirror 304. That is, when the reflecting mirror 304 is mounted on the wall portion 109, the tip portions 512a of the respective biasing metal fittings 512 are exposed to the surface of the reflecting mirror 304 and engage with the respective through holes 304a as illustrated in FIGS. 11A and 11B, such that ends of the through holes 304a are biased.

As described above, in the present exemplary embodiment, the tension imparting mechanisms 510 and 520 engage with the through holes 304a of the reflecting mirror 304, such that the tension in the negative direction of the Z axis is generated at a side inside the reflecting mirror 304 (at a side in the negative direction of the Z axis) where the tension imparting mechanism 510 is disposed, and the tension in the positive direction of the Z axis is generated at a side outside the reflecting mirror 304 (at a side in the positive direction of the Z axis) where the tension imparting mechanism 520 is disposed. That is, the tension is always imparted to the reflecting mirror 304 in the positive and negative directions of the Z axis, such that the reflecting mirror 304 always remains taut in the Z-axis direction.

As described above, in the present exemplary embodiment, the tension in the positive direction and the negative direction (transverse direction) of the Z axis and the tension in the positive direction and the negative direction (longitudinal direction) of the X axis are imparted to the long reflecting mirrors 301 and 302, such that the reflecting mirrors 301 and 302 always remain taut in the Z-axis direction and the X-axis direction. In addition, the tension in the positive direction and the negative direction of the Z axis is imparted to the short reflecting mirrors 303 and 304, such that the reflecting mirrors 303 and 304 always remain taut in the Z-axis direction. Therefore, the deformation of the reflecting mirrors 301, 302, 303, and 304 is assuredly inhibited even though the ultraviolet light from the LED element 210 reaches the reflecting mirrors 301, 302, 303, and 304 and the reflecting mirrors 301, 302, 303, and 304 are heated to a high temperature and thermally expanded. Further, as a result, the ultraviolet light from the LED element 210 is mixed by the reflecting mirrors 301, 302, 303, and 304 in accordance with a design value, such that a uniform light intensity distribution is obtained on the irradiation object.

While the present exemplary embodiment has been described above, the present invention is not limited to the aforementioned configurations and may be variously modified within the scope of the technical spirit of the present invention.

For example, in the case of the reflecting mirrors 301, 302, 303, and 304 of the present exemplary embodiment, the tension is generated by the tension imparting mechanisms 510 and 520 in the positive and negative directions of the Z axis, but the tension is not necessarily generated in both of the positive and negative directions as long as the tension is generated in the Z-axis direction. That is, any one of the tension imparting mechanisms 510 and 520 may be used.

In the case of the reflecting mirrors 301 and 302 of the present exemplary embodiment, the tension is imparted by the tension imparting mechanisms 530 and 540 in the positive and negative directions (longitudinal direction) of the X axis, but the tension imparting mechanisms 530 and 540 may be omitted as long as lengths in the X-axis direction of the reflecting mirrors 301 and 302 are short and the amount of thermal expansion in the X-axis direction is at a level that causes no problem.

In the case of the reflecting mirrors 303 and 304 of the present exemplary embodiment, the tension is generated by the tension imparting mechanisms 510 and 520 only in the positive and negative directions of the Z axis, but a configuration for imparting the tension in the positive and negative directions of the X axis may be added similar to the reflecting mirrors 301 and 302.

The tension imparting mechanisms 530 and 540 of the present exemplary embodiment are disposed on the protruding portions 301a and 301b of the reflecting mirrors 301 and 302, respectively, but it is acceptable as long as the tension imparting mechanism is configured to generate tension in the X-axis direction, and for example, the tension imparting mechanism 510 (or 520) may be rotated about the Y axis by 90° and may be disposed on the reflecting surfaces of the reflecting mirrors 301 and 302. That is, the tension imparting mechanism 510 (or 520) may be used instead of the tension imparting mechanisms 530 and 540.

Each of the tension imparting mechanisms 530 and 540 of the present exemplary embodiment is configured by a compressive spring, but it is acceptable as long as the tension imparting mechanism is configured to generate tension in the X-axis direction to the reflecting mirrors 301 and 302, and for example, a tension spring or a flat spring may be used.

The tension imparting mechanisms 510 and 520 of the present exemplary embodiment each use the biasing metal fitting 512 and the compressive spring 513, but it is acceptable as long as the tension imparting mechanisms generate tension in the Z-axis direction to the reflecting mirrors 301, 302, 303, and 304, and for example, a tension spring or a flat spring may be used.

The tension imparting mechanisms 510 and 520 of the present exemplary embodiment engage with the through holes (301c and 304a) formed in the reflecting mirrors 301, 302, 303, and 304, but the present invention is not limited to this configuration. For example, instead of the through holes (301c and 304a), bent portions, which protrude toward rear sides of the reflecting mirrors 301, 302, 303, and 304, may be installed, and the bent portions may be biased by the compressive springs 513.

The light emitting apparatus 1 of the present exemplary embodiment has been described as having the six LED modules 200, but the present invention is not limited to this configuration, and the present invention may be applied to a lamp type light source apparatus which uses a high-pressure mercury lamp or a mercury xenon lamp as a light source.

The light emitting apparatus 1 of the present exemplary embodiment has been described as emitting the ultraviolet light, but the present invention is not limited to this configuration, and the present invention may be applied to a light source apparatus which emits visible light or infrared light.

Second Exemplary Embodiment

Figure 12:
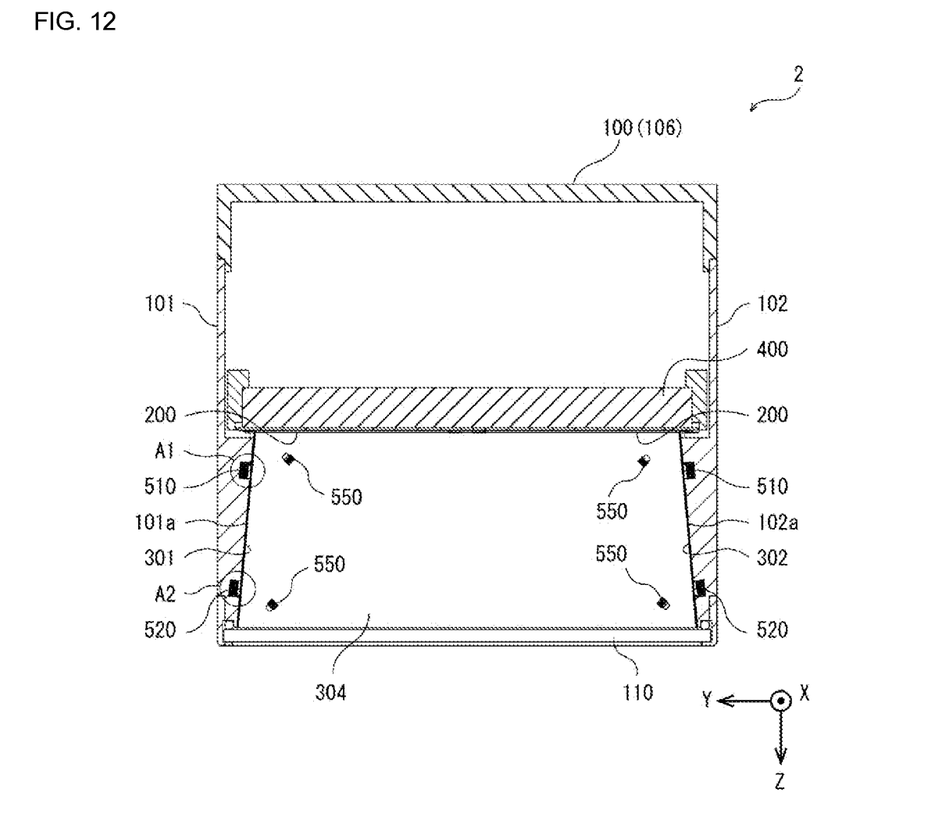
FIG. 12 is a view for explaining an internal configuration of a light emitting apparatus according to a second exemplary embodiment of the present invention.

FIG. 12 is a view for explaining an internal configuration of a light emitting apparatus 2 according to a second exemplary embodiment of the present invention. As illustrated in FIG. 12, the light emitting apparatus 2 of the present exemplary embodiment differs from the light emitting apparatus 1 according to the first exemplary embodiment of the present invention in that the light emitting apparatus 2 has four tension imparting mechanisms 550 (fifth tension imparting mechanism) disposed at four corners of each of the reflecting mirror 303 (not illustrated) and the reflecting mirror 304.

The tension imparting mechanisms 550 are members that have the same configuration as the tension imparting mechanisms 510 and 520 of the first exemplary embodiment, and the tension imparting mechanisms 550 engage with through holes formed at the four corners of each of the reflecting mirror 303 (not illustrated) and the reflecting mirror 304 and bias the reflecting mirror 303 (not illustrated) and the reflecting mirror 304 outward in a diagonal direction.

As described above, in the present exemplary embodiment, the tension is imparted by the four tension imparting mechanisms 550 to the reflecting mirror 303 (not illustrated) and the reflecting mirror 304 outward in the diagonal direction. Therefore, the tension is always imparted to the reflecting mirror 303 (not illustrated) and the reflecting mirror 304 in an oblique direction with respect to the Y axis and the Z axis, such that the reflecting mirror 303 (not illustrated) and the reflecting mirror 304 always remain taut on a Y-Z plane. Therefore, similar to the first exemplary embodiment, even in the present exemplary embodiment, the deformation of the reflecting mirror 303 (not illustrated) and the reflecting mirror 304 is assuredly inhibited even though the reflecting mirror 303 (not illustrated) and the reflecting mirror 304 are heated to a high temperature and thermally deformed.

In the present exemplary embodiment, the four tension imparting mechanisms 550 are configured at the four corners of each of the reflecting mirror 303 (not illustrated) and the reflecting mirror 304, but the tension imparting mechanisms 550 may be applied to the reflecting mirrors 301 and 302 instead of the tension imparting mechanisms 510, 520, 530, and 540. That is, the four corners of the reflecting mirrors 301 and 302 may be configured to be biased outward in the diagonal direction.

Meanwhile, the exemplary embodiments disclosed herein are described for illustration in all aspects and are not limited. The scope of the present invention is represented by the appended claims instead of the above description, and all the changes derived from the equivalent meaning and the scope of the claims are intended to fall within the scope of the present invention.

DESCRIPTION OF REFERENCE NUMERALS 1, 2 Light emitting apparatus
100 Casing
101 Upper panel
101a, 102a Inclined surfaces
101b Concave portion
101ba Wall surface
101c Concave portion
101d Screw hole
102 Lower panel
103 Right panel
104 Left panel
105 Front panel
105a Opening
106 Rear panel
108, 109 Wall portion
109a Concave portion
110 Window unit
200 LED module
205 Substrate
210 LED element
301, 302, 303, 304 Reflecting mirrors
301a, 301b Protruding portions
301aa, 301ba, 301c Through holes
301ab, 301bb Ends
304a Through hole
400 Heat dissipation member
510, 520, 530, 540, 550 Tension imparting mechanisms
511 Spring holder
511a Flange portion
511b Through hole
511c, 511d Groove portions
512 Biasing metal fitting
512a Tip portion
512b Base end
512c Intermediate portion
513 Compressive spring
513a One end
513b The other end
514 Fixing screw
540a One end
540b The other end
600 Spring holder
601 Flange portion
601a Through hole
602 Groove portions
603 Engaging portion

The invention claimed is:

1. A light emitting apparatus comprising:
a light source;
a thin plate-shaped mirror unit which guides light from the light source; and
a tension imparting means which imparts tension to the mirror unit, the tension imparting means including at least any one of a first tension imparting mechanism which imparts tension in a first direction toward the light source along a surface of the mirror unit, and a second tension imparting mechanism which imparts tension in a second direction opposite to the first direction.

2. The light emitting apparatus according to claim 1, wherein
the mirror unit has two ends located at sides opposite to each other in a direction parallel to the first direction, and
the first tension imparting mechanism has a first biasing means which biases one of the two ends of the mirror unit toward the first direction, and the second tension imparting mechanism has a second biasing means which biases another one of the two ends of the mirror unit toward the second direction.

3. The light emitting apparatus according to claim 2, wherein
the mirror unit has an effective reflecting area, the light from the light source being irradiated within the effective reflecting area at a front side of the mirror unit, and
the first biasing means and the second biasing means are disposed within the effective reflecting area at a rear side opposite to the front side of the mirror unit.

4. The light emitting apparatus according to claim 2, wherein each of the first biasing means and the second biasing means is a compressive spring, a tension spring, or a flat spring.

5. A light emitting apparatus, comprising:
a light source;
a thin plate-shaped mirror unit which guides light from the light source; and
a tension imparting means which imparts tension to the mirror unit, the tension imparting means including at least any one of one tension imparting mechanism which imparts tension in a first direction in parallel with the light source along a surface of the mirror unit, and another tension imparting mechanism which imparts tension in a second direction opposite to the first direction.

6. The light emitting apparatus according to claim 1, wherein the tension imparting means further includes at least any one of a third tension imparting mechanism which imparts tension in a third direction in parallel with the light source along a surface of the mirror unit, and a fourth tension imparting mechanism which imparts tension in a fourth direction opposite to the third direction.

7. The light emitting apparatus according to claim 5, wherein
the mirror unit has two ends located at sides opposite to each other in a direction parallel to the first direction, and
the one tension imparting mechanism has one biasing means which biases one of the two ends of the mirror unit toward the first direction, and the other tension imparting mechanism has another biasing means which biases another one of the two ends of the mirror unit toward the second direction.

8. The light emitting apparatus according to claim 6, wherein
the mirror unit has two ends located at sides opposite to each other in a direction parallel to the first direction, and
the third tension imparting mechanism has a third biasing means which biases one of the two ends of the mirror unit toward the third direction, and the fourth tension imparting mechanism has a fourth biasing means which biases another one of the two ends of the mirror unit toward the fourth direction.

9. The light emitting apparatus according to claim 7, wherein
the mirror unit has an effective reflecting area, the light from the light source being irradiated within the effective reflecting area at a front side of the mirror unit, and
the one biasing means and the other biasing means are disposed within the effective reflecting area at a rear side opposite to the front side of the mirror unit.

10. The light emitting apparatus according to claim 7, wherein
the mirror unit has an effective reflecting area in which the light from the light source is irradiated, and
the one biasing means and the other biasing means are disposed outside the effective reflecting area of the mirror unit.

11. The light emitting apparatus according to claim 7, wherein each of the one biasing means and the other biasing means is a compressive spring, a tension spring, or a flat spring.

12. A light emitting apparatus, comprising:
a light source;
a thin plate-shaped mirror unit which guides light from the light source; and
a tension imparting mechanism which imparts tension outward in a diagonal direction along a surface of the mirror unit.

13. The light emitting apparatus according to claim 12, wherein
the mirror unit has a rectangular shape with four corners, and
the tension imparting mechanism includes four biasing means each disposed at a corresponding one of the four corners of the mirror unit, each biasing means biasing the corresponding one of the four corners of the mirror unit outward in a respective diagonal direction.

14. The light emitting apparatus according to claim 13, wherein
the mirror unit has an effective reflecting area, the light from the light source being irradiated within the effective reflecting area at a front side of the mirror unit, and
said each biasing means is disposed at a rear side opposite to the front side of the effective reflecting surface of the mirror unit.

15. The light emitting apparatus according to claim 12, wherein the biasing means is a compressive spring, a tension spring, or a flat spring.

16. The light emitting apparatus, according to claim 1, wherein
the mirror unit includes a plurality of thin plate-shaped mirror units that are provided to surround the light source.

17. The light emitting apparatus, according to claim 1, wherein
the mirror unit includes a plurality of thin plate-shaped mirror units, at least one of the mirror units being inclined with respect to an optical axis of the light source.

18. The light emitting apparatus according to claim 1, wherein the light source has a substrate, and a light emitting element is disposed on a surface of the substrate.

19. The light emitting apparatus according to claim 1, wherein the light emitted from the light source has a wavelength in an ultraviolet range.

* * * * *